United States Patent
Dutta et al.

(10) Patent No.: US 12,323,252 B2
(45) Date of Patent: Jun. 3, 2025

(54) BLIND RE-TRANSMISSION (reTx) FOR SIDELINK COMMUNICATIONS

(71) Applicant: QUALCOMM Incorporated, San Diego, CA (US)

(72) Inventors: Sourjya Dutta, San Diego, CA (US); Tien Viet Nguyen, Bridgewater, NJ (US); Kapil Gulati, Belle Mead, NJ (US); Gabi Sarkis, San Diego, CA (US)

(*) Notice: Subject to any disclaimer, the term of this patent is extended or adjusted under 35 U.S.C. 154(b) by 644 days.

(21) Appl. No.: 17/449,708

(22) Filed: Oct. 1, 2021

(65) Prior Publication Data

US 2022/0109526 A1  Apr. 7, 2022

Related U.S. Application Data

(60) Provisional application No. 63/087,141, filed on Oct. 2, 2020.

(51) Int. Cl.
| | |
|---|---|
| H04L 1/18 | (2023.01) |
| H04L 1/1809 | (2023.01) |
| H04L 1/1829 | (2023.01) |
| H04L 1/20 | (2006.01) |
| H04W 74/0808 | (2024.01) |

(52) U.S. Cl.
CPC .......... H04L 1/1809 (2013.01); H04L 1/1832 (2013.01); H04L 1/1854 (2013.01); H04L 1/203 (2013.01); H04W 74/0808 (2013.01)

(58) Field of Classification Search
None
See application file for complete search history.

(56) References Cited

U.S. PATENT DOCUMENTS

| | | | | |
|---|---|---|---|---|
| 2017/0207845 A1* | 7/2017 | Moon | ..................... | H04B 7/088 |
| 2020/0260397 A1* | 8/2020 | Vos | ..................... | H04W 74/0833 |
| 2021/0051525 A1* | 2/2021 | Cao | ..................... | H04W 28/26 |
| 2022/0217565 A1* | 7/2022 | Thangarasa | ....... | H04W 56/0045 |
| 2023/0072619 A1* | 3/2023 | Yin | ..................... | H04L 1/0023 |
| 2023/0099975 A1* | 3/2023 | Hahn | ..................... | H04W 80/02 |
| | | | | 370/329 |

FOREIGN PATENT DOCUMENTS

| | | | | | |
|---|---|---|---|---|---|
| CN | | 109564097 A | * | 4/2019 | ............. G01C 21/26 |
| WO | WO-2013107042 A1 | | * | 7/2013 | .......... H04W 64/006 |
| WO | WO-2021090248 A1 | | * | 5/2021 | ........... H04L 5/0053 |

* cited by examiner

*Primary Examiner* — Brandon M Renner

(57) ABSTRACT

This disclosure provides systems, methods, and devices for wireless communication that support blind reTx for sidelink communication. In a first aspect, a method of wireless communication includes determining a first threshold based on a first number of re-transmissions per packet associated with a first time window, a second threshold based on a first reference signal receive power (RSRP) threshold for resource selection/exclusion associated with the first time window, or a combination thereof. The method further includes initiating a blind transmission (Tx) based on a determination that a second number of re-transmissions per packet associated with a second time window is greater than or equal to the first threshold, a determination that a second RSRP threshold associated with the second time window is less than or equal to the second threshold, or a combination thereof. Other aspects and features are also claimed and described.

22 Claims, 8 Drawing Sheets

600

602
Determine a first threshold based on a first number of re-transmissions per packet associated with a first time window, a second threshold based on a first reference signal receive power (RSRP) threshold for resource selection/ exclusion associated with the first time window, or a combination thereof 604
Initiate a blind transmission (Tx) based on a determination that a second number of re-transmissions per packet associated with a second time window is greater than or equal to the first threshold, a determination that a second RSRP threshold associated with the second time window is less than or equal to the second threshold, or a combination thereof

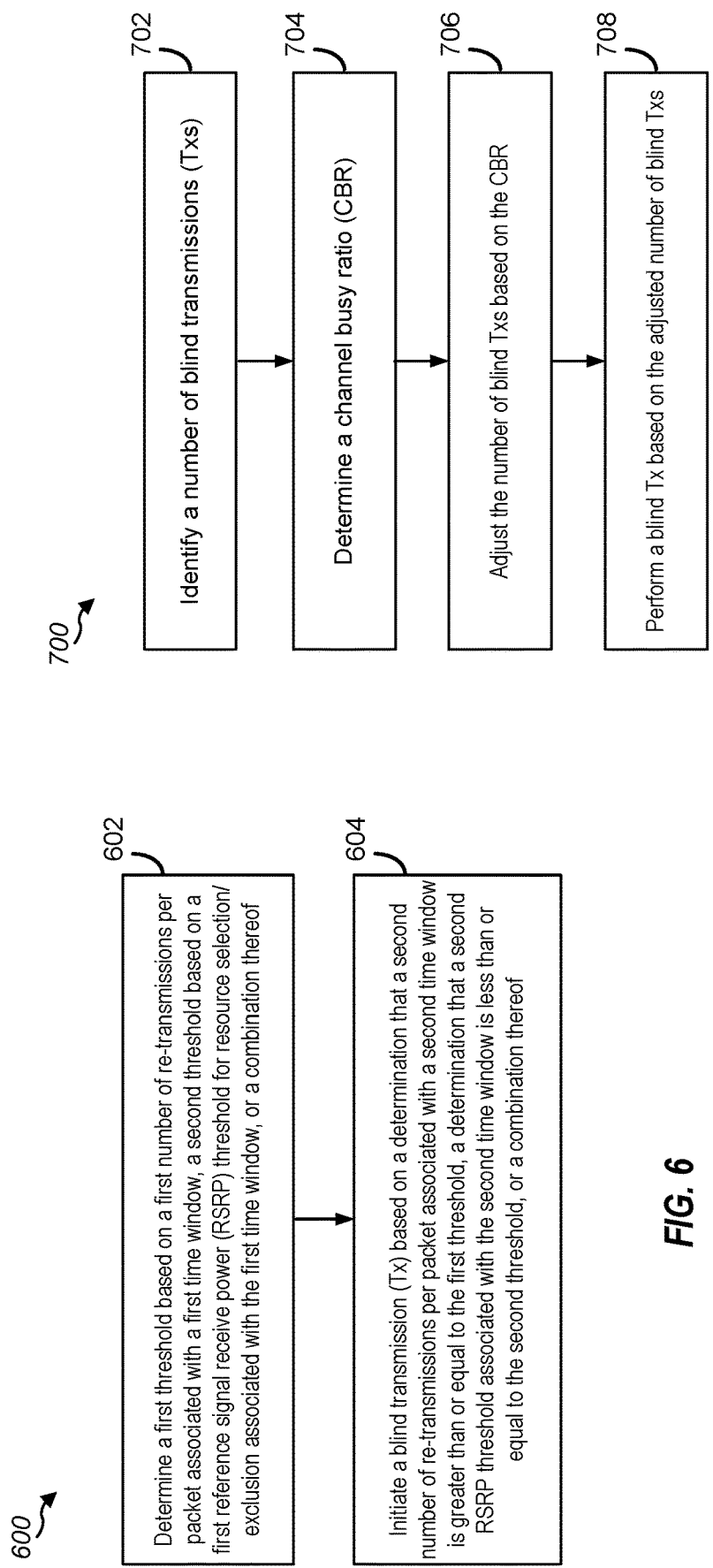

BLIND RE-TRANSMISSION (reTx) FOR SIDELINK COMMUNICATIONS

CROSS-REFERENCE TO RELATED APPLICATIONS

This application claims the benefit of U.S. Provisional Patent Application No. 63/087,141, entitled, "BLIND RE-TRANSMISSION (reTx) FOR SIDELINK COMMUNICATIONS," filed on Oct. 2, 2020, (208307P1) the disclosure of which is hereby incorporated by reference herein in its entirety as if fully set forth below and for all applicable purposes.

TECHNICAL FIELD

Aspects of the present disclosure relate generally to wireless communication systems, and more particularly, to sidelink communications, such as blind re-transmission (reTx) for sidelink communications. Some features may enable and provide improved communications, including increased blind transmissions, an increased chance of decoding sidelink control information, or a combination thereof.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Vehicle-to-everything (V2X) technology enables sharing of information from a vehicle to another device or entity that may affect the vehicle, and vice versa. V2X technology is associated with a vehicular communication system that can include one or more aspects or types of communication, such as vehicle-to-vehicle (V2V), vehicle-to-infrastructure (V2I), vehicle-to-network (V2N), vehicle-to-pedestrian (V2P), vehicle-to-device (V2D), and vehicle-to-grid (V2G), as illustrative, non-limiting examples. V2X technology can utilize cellular based communication or wireless local area network communication. To illustrate, cellular V2X (C-V2X) is a 3rd Generation Partnership Project (3GPP) standard and uses 3GPP standardized 4G LTE or 5G mobile cellular connectivity to send and receive signals from a vehicle to other vehicles, pedestrians or to fixed objects such as traffic lights in its surroundings. As part of the 3GPP Release 14, C-V2X defines two transmission modes that, together, enable a broad range of use cases. Direct C-V2X, which includes vehicle-to-vehicle (V2V), vehicle-to-infrastructure (V2I), and vehicle-to-pedestrian (V2P), provides enhanced communication range and reliability in dedicated ITS 5.9 GHz spectrum that's independent of a cellular network, as well as network communications (V2N) in traditional mobile broadband licensed spectrum.

A UE performing V2X communication, or device-to-device (D2D), may operate according to a distributed resource selection in which a base station does not schedule one or more resources. During data transmission (Tx), the UE may transmit sidelink control information (SCI). The SCI may include reservation information, decode information, hybrid automatic repeat request (HARQ) information, one or more future reservations, or a combination thereof. Each UE in a network may monitor or sense a channel for an SCI transmitted by another device and try to decoded a detected SCI. Based on a measured reference signal receive power of a detected SCI, one or more UEs may avoid resources reserved by another UE—while each of the one or more UEs also may be attempting to receive its own resource.

Reliability of V2X communications, such as sidelink communications, may deteriorate due to a variety of reasons. For example, a SCI decode failure may occur in which one or more UEs may be unable to sense an SCI from another device. As another example, two UEs configured in half-duplex may transmit at the same time and be unaware of a resource reservation by the other UE. Additionally, UEs that are close to each other may not receive an SCI from another UE due to channel conditions, such as interference, collisions, blocking, no line of sight, as illustrative, non-limiting examples. As another example, a first UE may choose the same resource as the first UE due to delay budget constraints.

Inter-UE coordination may be used in an effort to improve reliability in the scenarios described above. To illustrate, a first UE may have good links with both a second UE and a third UE, but the second UE and the third UE may not have a good link. The third may notify about possible collisions which is received by the first UE and forwarded to the second UE. The first UE may also forward SCI form the third UE to the second UE, or from the second UE to the third UE. Additionally, the third UE may notify about half duplex issues, such as when multiple UEs transmit at the same time and cause collisions. To illustrate, the third UE may be able to decode both the Txs but identify a possible half-duplex issue and send a negative acknowledgement (NACK) or another notification to initiate a re-transmission (reTx) by one of the UEs. However, the inter-UE coordination techniques may be limited to situations where SCIs between two UEs are decodable. Otherwise, a feedback, such as a NACK or other notification, cannot be sent to the UEs involved in the collision. In addition to limitations with inter-UE coordination, link reliability may also be an issue at intersections, such as a cross-road where two streets meet. For example, vehicles on different streets may have a higher probability of having a non-line of sight link as compared to two vehicles on the same street or in the same lane. Accordingly, V2X communication, such as sidelink communication, present several obstacles and challenges to avoid SCI decode failures, half-duplex issues, hidden node problems, and collisions, and ensure reliability for sidelink communication.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure may be implemented in a method of wireless communication performed by a user equipment (UE). The method includes determining a first threshold based on a first number of re-transmissions per packet associated with a first time window, a second threshold based on a first reference signal receive power (RSRP) threshold for resource selection/exclusion associated with the first time window, or a combination thereof. The method further includes initiating a blind transmission (Tx) based on a determination that a second number of re-transmissions per packet associated with a second time window is greater than or equal to the first threshold, a determination that a second RSRP threshold associated with the second time window is less than or equal to the second threshold, or a combination thereof.

Another innovative aspect of the subject matter described in this disclosure may be implemented in a UE. The UE includes a memory storing processor-readable code and at least one processor coupled to the memory. The at least one processor is configured to execute the processor-readable code to cause the at least one processor to determine a first threshold based on a first number of re-transmissions per packet associated with a first time window, a second threshold based on a first RSRP threshold for resource selection/exclusion associated with the first time window, or a combination thereof. The at least one processor is further configured to execute the processor-readable code to cause the at least one processor to initiate a blind Tx based on a determination that a second number of re-transmissions per packet associated with a second time window is greater than or equal to the first threshold, a determination that a second RSRP threshold associated with the second time window is less than or equal to the second threshold, or a combination thereof.

Another innovative aspect of the subject matter described in this disclosure may be implemented in an apparatus configured for wireless communication. The apparatus includes means for determining a first threshold based on a first number of re-transmissions per packet associated with a first time window, a second threshold based on a first RSRP threshold for resource selection/exclusion associated with the first time window, or a combination thereof. The apparatus further includes means for initiating a blind Tx based on a determination that a second number of re-transmissions per packet associated with a second time window is greater than or equal to the first threshold, a determination that a second RSRP threshold associated with the second time window is less than or equal to the second threshold, or a combination thereof.

Another innovative aspect of the subject matter described in this disclosure may be implemented in a non-transitory computer-readable medium storing instructions that, when executed by a processor, cause the processor to perform operations including determining a first threshold based on a first number of re-transmissions per packet associated with a first time window, a second threshold based on a first RSRP threshold for resource selection/exclusion associated with the first time window, or a combination thereof. The operations further include initiating a blind Tx based on a determination that a second number of re-transmissions per packet associated with a second time window is greater than or equal to the first threshold, a determination that a second RSRP threshold associated with the second time window is less than or equal to the second threshold, or a combination thereof.

Another innovative aspect of the subject matter described in this disclosure may be implemented in a method of wireless communication performed by a UE. The method includes identifying a number of blind Txs. The method also includes determining a channel busy ratio (CBR). The method includes adjusting the number of blind Txs based on the CBR. The method further includes performing a blind Tx based on the adjusted number of blind Txs.

Another innovative aspect of the subject matter described in this disclosure may be implemented in a UE. The UE includes a memory storing processor-readable code and at least one processor coupled to the memory. The at least one processor is configured to execute the processor-readable code to cause the at least one processor to identify a number of blind Txs. The at least one processor is also configured to execute the processor-readable code to cause the at least one processor to determine a CBR. The at least one processor is configured to execute the processor readable code to cause the at least one processor to adjust the number of blind Txs based on the CBR. The at least one processor is further configured to execute the processor-readable code to cause the at least one processor to perform a blind Tx based on the adjusted number of blind Txs.

Another innovative aspect of the subject matter described in this disclosure may be implemented in an apparatus configured for wireless communication. The apparatus includes means for identifying a number of blind Txs. The apparatus also includes means for determining a CBR. The apparatus includes means for adjusting the number of blind Txs based on the CBR. The apparatus further includes means for performing a blind Tx based on the adjusted number of blind Txs.

Another innovative aspect of the subject matter described in this disclosure may be implemented in a non-transitory computer-readable medium storing instructions that, when executed by a processor, cause the processor to perform operations including identifying a number of blind Txs. The operations also include determining a CBR. The operations include adjusting the number of blind Txs based on the CBR. The operations further include performing a blind Tx based on the adjusted number of blind Txs.

Another innovative aspect of the subject matter described in this disclosure may be implemented in a method of wireless communication performed by a UE. The method includes determining whether a number of blind Txs is less than or equal to a first threshold. The method also includes, based on a determination that the number of blind Txs is less than the first threshold, determining whether a packet error rate associated with a zone is greater than or equal to a second threshold, determining whether a ratio is less than or equal to a third threshold, the ratio based on a number of real re-transmissions (reTxs) and the number of blind Txs, or a combination thereof. The method further includes, based on a determination that the packet error rate is greater than or equal to the first threshold, the ratio is less than or equal to the third threshold, or a combination thereof, adjusting the number of blind Txs.

Another innovative aspect of the subject matter described in this disclosure may be implemented in a UE. The UE includes a memory storing processor-readable code and at least one processor coupled to the memory. The at least one processor is configured to execute the processor-readable code to cause the at least one processor to determine whether a number of blind Txs is less than or equal to a first threshold. The at least one processor is also configured to execute the processor-readable code to cause the at least one processor to, based on a determination that the number of blind Txs is less than the first threshold, determine whether a packet error rate associated with a zone is greater than or equal to a second threshold, determine whether a ratio is less than or equal to a third threshold, the ratio based on a number of real reTxs and the number of blind Txs, or a combination thereof. The at least one processor is further configured to execute the processor-readable code to cause the at least one processor to, based on a determination that the packet error rate is greater than or equal to the first threshold, the ratio is less than or equal to the third threshold, or a combination thereof, adjust the number of blind Txs.

Another innovative aspect of the subject matter described in this disclosure may be implemented in an apparatus configured for wireless communication. The apparatus includes means for determining whether a number of blind Txs is less than or equal to a first threshold. The apparatus also includes means for, based on a determination that the number of blind Txs is less than the first threshold, determining whether a packet error rate associated with a zone is greater than or equal to a second threshold, determining whether a ratio is less than or equal to a third threshold, the ratio based on a number of real reTxs and the number of blind Txs, or a combination thereof. The apparatus further includes means for, based on a determination that the packet error rate is greater than or equal to the first threshold, the ratio is less than or equal to the third threshold, or a combination thereof, adjusting the number of blind Txs.

Another innovative aspect of the subject matter described in this disclosure may be implemented in a non-transitory computer-readable medium storing instructions that, when executed by a processor, cause the processor to perform operations including determining whether a number of blind Txs is less than or equal to a first threshold. The operations also include, based on a determination that the number of blind Txs is less than the first threshold, determining whether a packet error rate associated with a zone is greater than or equal to a second threshold, determining whether a ratio is less than or equal to a third threshold, the ratio based on a number of real reTxs and the number of blind Txs, or a combination thereof. The operations further include, based on a determination that the packet error rate is greater than or equal to the first threshold, the ratio is less than or equal to the third threshold, or a combination thereof, adjusting the number of blind Txs.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a flow diagram illustrating an example process that supports blind reTx for sidelink communication according to one or more aspects.

FIG. 7 is a flow diagram illustrating an example process that supports blind reTx for sidelink communication according to one or more aspects.

Like reference numbers and designations in the various drawings indicate like elements.

DETAILED DESCRIPTION

Figure 1:
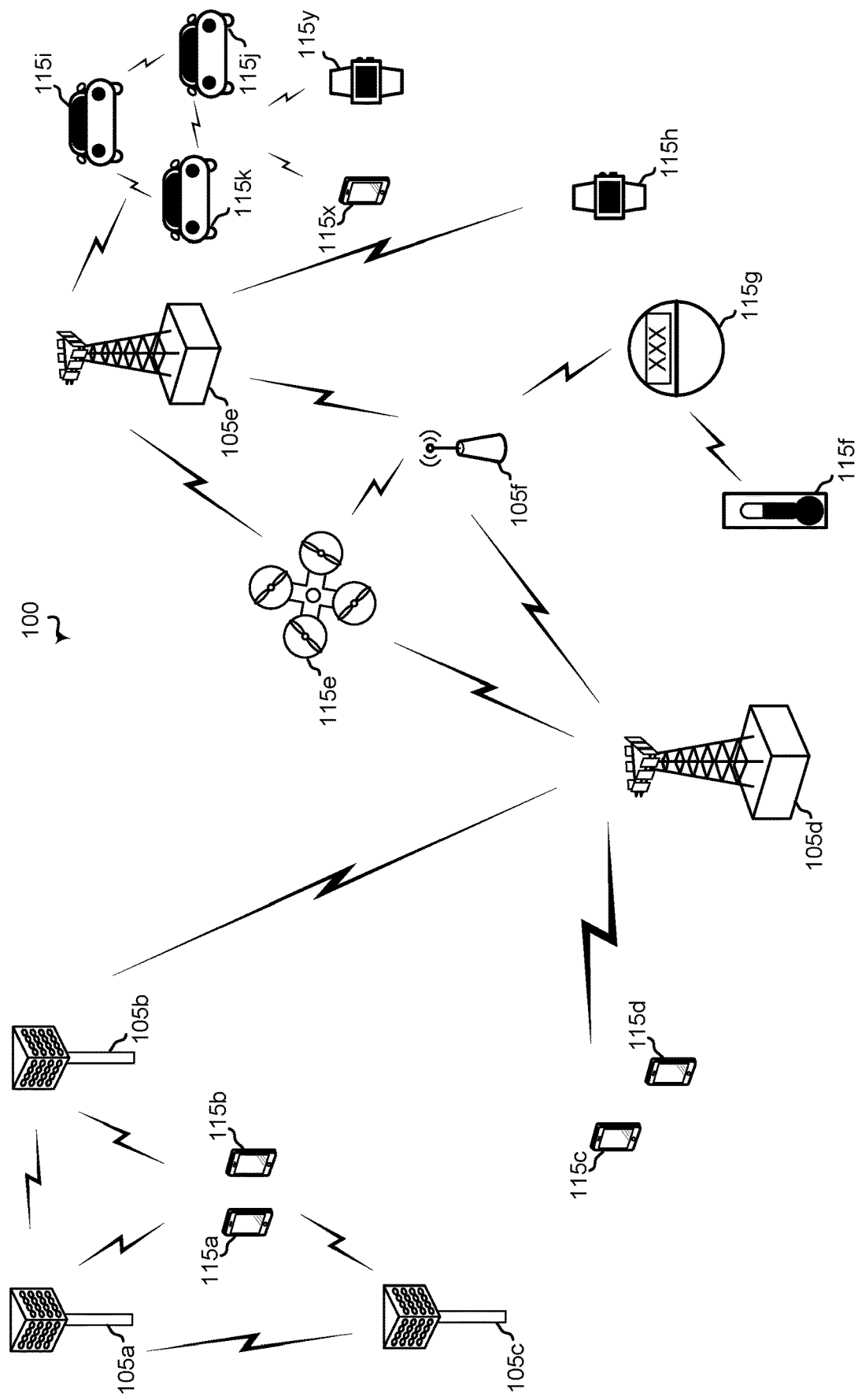
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail device or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspect. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e. Additionally, V2V mesh network may include or correspond to a vehicle-to-everything (V2X) network between UEs 115i-115k and one or more other devices, such as UEs 115x, 115y.

Figure 2:
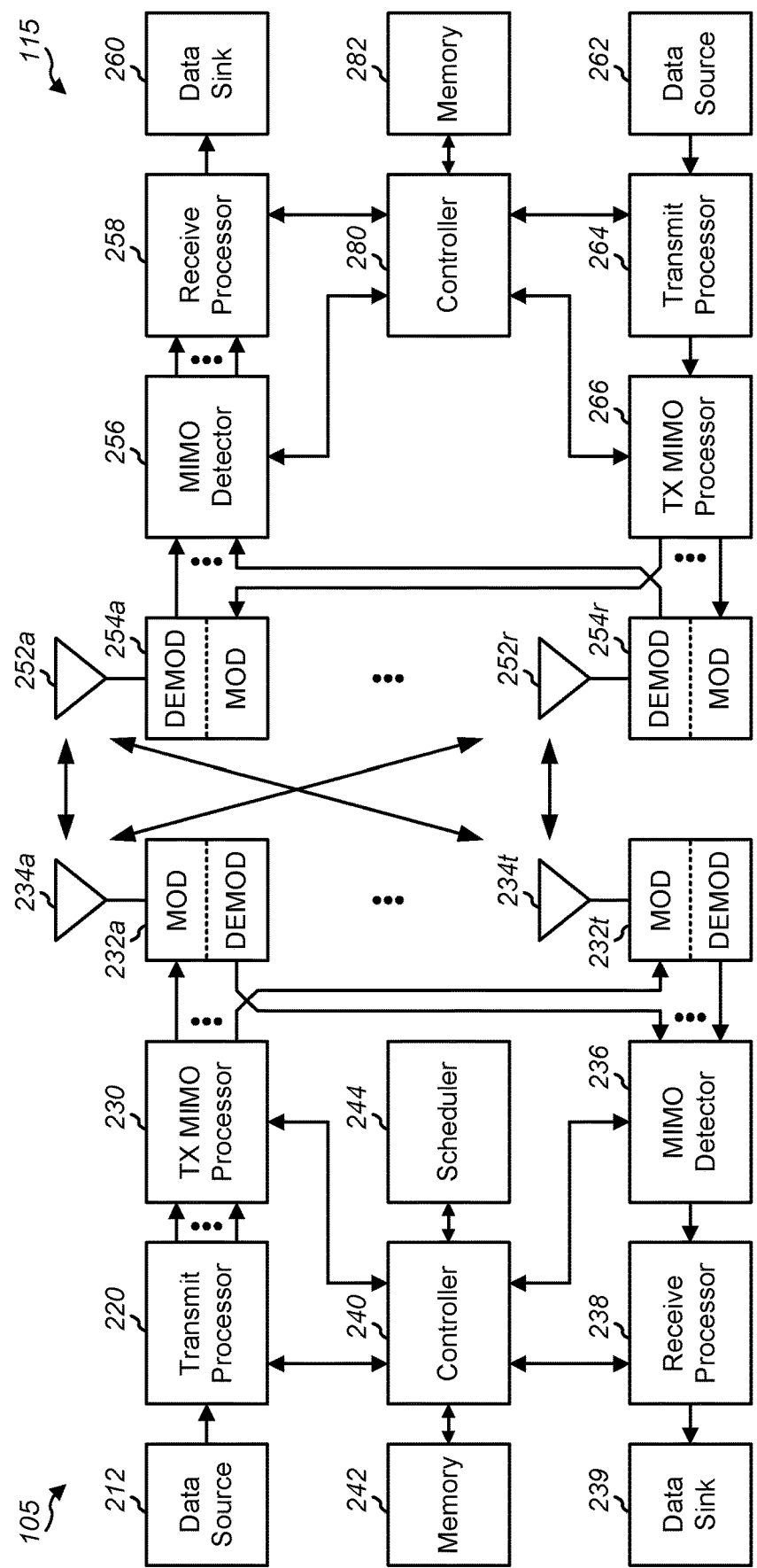
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 6-8, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Existing V2X interface protocols provide for dynamic and configured grants for sidelinks (e.g., a PSCCH or PSSCH) using a PC5 interface. A DG may provide a one-time grant of sidelink resources, such as responsive to instantaneous demand/need for sidelink communication. A CG may provide a grant of sidelink resources enabling continued/periodic/repeated sidelink communication. A first type of sidelink resource grant (Type 1) of the V2X interface protocols uses RRC to configure a UE with resources of a CG. A second type of sidelink resource grant (Type 2) of the V2X interface protocols uses DCI over a PDCCH to configure a UE with resources of a DG or a CG. For example, the DCI may be a DG and provide allocation of resources to be used for sidelink communication. Alternatively, the DCI may be a CG and activate/deactivate a CG for sidelink communication.

Resource allocation for sidelink communication may be performed according to one or more modes, such as a first mode (Mode 1) or a second mode (Mode 2). In the first mode (Mode 1), a base station, a base station, such as a gNB, assigns one or more resources to be used by a TX UE and an RX UE. To illustrate, the base station may transmit DCI in the Uu interface to the TX UE to grant the one or more resources to the TX UE for sideline communication. In the second mode (Mode 2), the TX UE autonomously selects the one or more resources for the sidelink communication—i.e., the base station does not assign the one or more resources. Operation of an RX UE may be the same for both the first mode (Mode 1) and the second mode (Mode 2).

Figure 3A:
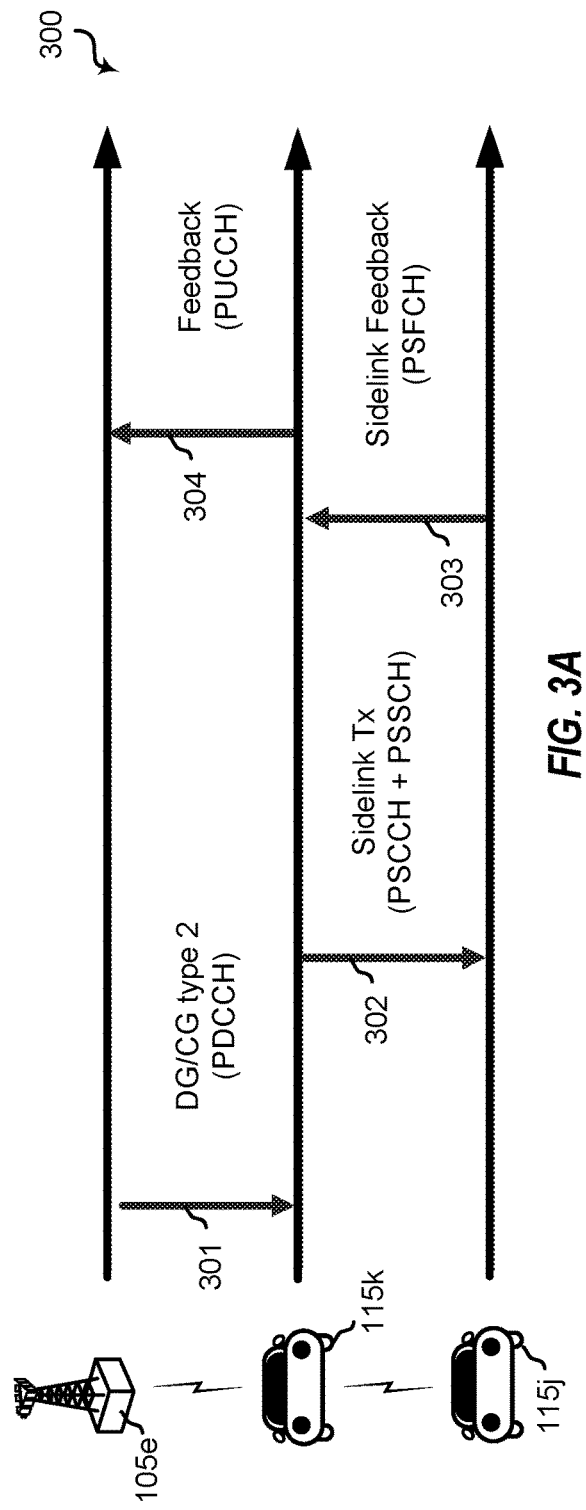
FIG. 3A is a mode 1 physical-layer procedure flow for sidelink resource grants in accordance with vehicle-to-everything (V2X) interface dynamic grant (DG)/configured grant (CG) Type 2 protocols.

FIG. 3A illustrates a Mode 1 physical-layer procedure flow (procedure flow 300) for sidelink resource grants in accordance with the above mentioned V2X interface DG/CG Type 2 protocols. Procedure flow 300 of FIG. 3A is described with reference to a V2X mesh network between UEs 115j and 115k communicating with macro base station 105e, as shown in wireless network 100 of FIG. 1. It should be understood, however, that the procedure flow may be implemented with respect to various UEs and UE configurations.

Procedure flow 300 may be an example of the first mode (Mode 1) in which resource allocation of Tx resources for sidelink communications is performed by the base station 105e through DCI 3_0. DCI 3_0 may be transmitted by the base station 105e to allocation time and frequency resources and may indicate transmission timing. The first mode (Mode 1) may support dynamic grants (DG), configured grants (CG) type 1, and CG type 2. CG type 1 may be activated via RRC signaling from the base station 105e. MCS may be decided by the TX UE, such as UE 115k, within a limit set by the base station 105e.

In procedure flow 300 of FIG. 3A, base station 105a uses DCI, provided according to DCI format 3_0 and which is configured to correspond to UE 115k (e.g., sidelink TX UE), to deliver a DG/CG Type 2 to UE 115k at procedure 501. DCI format 3_0 provides fields for time gap, hybrid automatic repeat request (HARQ) process identification, new data indicator, lowest index of the subchannel allocation to the initial transmission, first-stage SCI format 0-1 fields (including frequency resource assignment and time resource assignment), physical sidelink feedback channel (PSFCH) to HARQ feedback timing indicator, and PUCCH resource indicator, as well as configuration index in the case of CG. Base station 105a prepares the DCI with a sidelink-radio network temporary identifier (SL-RNTI) for UE 115, in the case of DG, or sidelink-configured scheduling-radio network temporary identifier (SL-CS-RNTI) for UE 115k, in the case of CG, to configure the DCI to correspond to UE 115k. In particular, the cyclic redundancy check (CRC) of the DCI is scrambled by SL-RNTI or SL-CS-RNTI for UE 115k in order to deliver a DG/CG Type 2 to the UE (e.g., sidelink TX UE).

In the case of CG, UE 115k (e.g., sidelink TX UE) reports the activation (or deactivation) of a sidelink (not shown in procedure flow 300). In particular, activation/deactivation of a CG sidelink is reported through media access control-control element (MAC-CE). MAC-CE reporting is also used by UE 115k to provide sidelink buffer status reports (BSRs) to base station 105e. For example, UE 115k may have provided a BSR indicating data for sidelink communication is contained in the UE buffer, resulting in initiating the sidelink resource grant of procedure 301.

At procedure 302 of procedure flow 300, UE 115k (e.g., sidelink TX UE) uses SCI, provided according to SCI format 0-1 (e.g., for scheduling physical sidelink shared channel (PSSCH) and second-stage SCI on PSSCH) and SCI format 0-2 (e.g., for decoding PSSCH) to schedule PSSCH and transmits data through PSSCH to UE 115j (e.g., sidelink receiver (RX) UE) according to the DG/CG Type 2 (sidelink resource grant of procedure 301). SCI format 0-1 provides fields for priority, frequency resource assignment, time resource assignment, resource reservation period, demodulation reference signal (DMRS) pattern, second-stage SCI format (broadcast, unicast, groupcast), Beta_offset indicator, number of DMRS port, modulation and coding scheme (MCS), and a reserved field. SCI format 0-2 provides fields for HARQ process identification, new data indicator, redundancy version, source identification, destination identification, and channel state information (CSI) request, also if the second-stage SCI format field in the corresponding SCI provided in SCI format 0-1 indicates type 1 groupcast zone identification and communication range requirement fields are present. MCS selection is up to the sidelink TX UE (e.g., UE 115k in procedure flow 300), within limits set by the base station (e.g., base station 105e).

It can be seen from the foregoing that the base station schedules node resources for the sidelink TX UE (procedure 301) and the sidelink TX UE implements one or more sidelinks with sidelink RX UEs using some or all of the scheduled resources (procedure 302). However, the base station does not control how the sidelink TX UE uses the resources and which UEs are selected as the sidelink RX UEs by the sidelink TX UE. The existing V2X do not enable a base station making a sidelink resource grant to a sidelink TX UE to schedule sidelink resources for a specific sidelink (e.g., a sidelink between that sidelink TX UE and a specified sidelink RX UE). Additionally, existing V2X may provide a single grant for a single sidelink communication, such as a single sidelink unicast communication.

Continuing with procedure flow 300 of FIG. 3A, UE 115j (e.g., sidelink RX UE) provides sidelink feedback to UE 115k (e.g., sidelink TX UE) at procedure 303. In particular, UE 115j sends ACK/NACK on PSFCH upon receiving each transmission according to DG/CG Type 2.

At procedure 304 of procedure flow 300, UE 115k (e.g., sidelink TX UE) forwards the sidelink feedback provided by UE 115j (e.g., sidelink RX UE) to base station 105e. In particular, UE 115k forwards the ACK/NACK received from UE 115j to base station 105e on PUCCH.

Figure 3B:
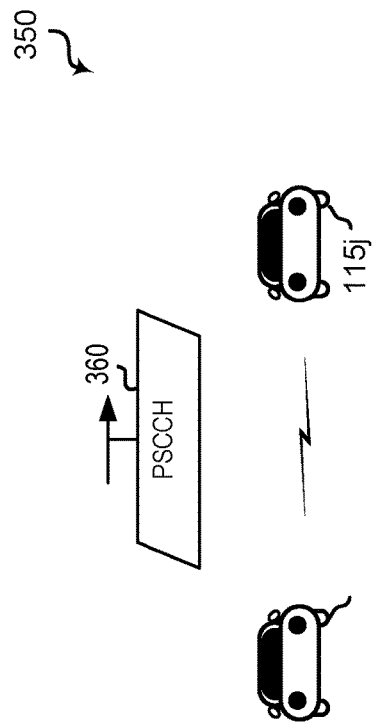
FIG. 3B is a mode 2 physical-layer procedure flow for sidelink communication.

FIG. 3B illustrates a Mode 2 physical-layer procedure flow (procedure flow 350) for sidelink resource grants in accordance with the above mentioned V2X interface. Procedure flow 350 of FIG. 3B is described with reference to a V2X mesh network between UEs 115j and 115k. It should be understood, however, that the procedure flow may be implemented with respect to various UEs and UE configurations.

In the second mode (Mode 2), TX UE 115k performs channel sensing by blindly decoding all PSCCH channels and identifies reserved resources by other sidelink transmissions. TX UE 115k reports available resources to an upper layer (of TX UE 115k) and the upper layer decides resource usage.

In procedure flow 350 of FIG. 3B, after a decision of the resource usage, TX UE 115k transmits a PSCCH 360. PSCCH 360 may also include sidelink control information (SCI), such as SCI 0_1. The SCI may include information about a bandwidth, one or more resource reservations, a source ID of TX UE 115k, decode information, hybrid automatic repeat request (HARQ) information, or a combination thereof.

Additionally, in procedure flow 350, RX UE 115j performs blind decoding of one or more subchannels to detect PSCCH 360. In procedure flow 350, after transmitting PSCCH 360, TX UE 115k may transmit a PSSCH (not shown) to RX UE 115j. In some implementations, PSCCH 360 and PSSCH are transmitted within a same slot. The PSSCH may include SCI that includes or indicates a source ID (associated with TX UE 115k) and a destination ID (associated with RX UE 115j), which are used to distinguish whether the packet is for RX UE 115j and coming from which TX UE. After transmission of the PSSCH by TX UE 115k, RX UE 115j may transmit PSFCH to TX UE 115k.

Figure 4:
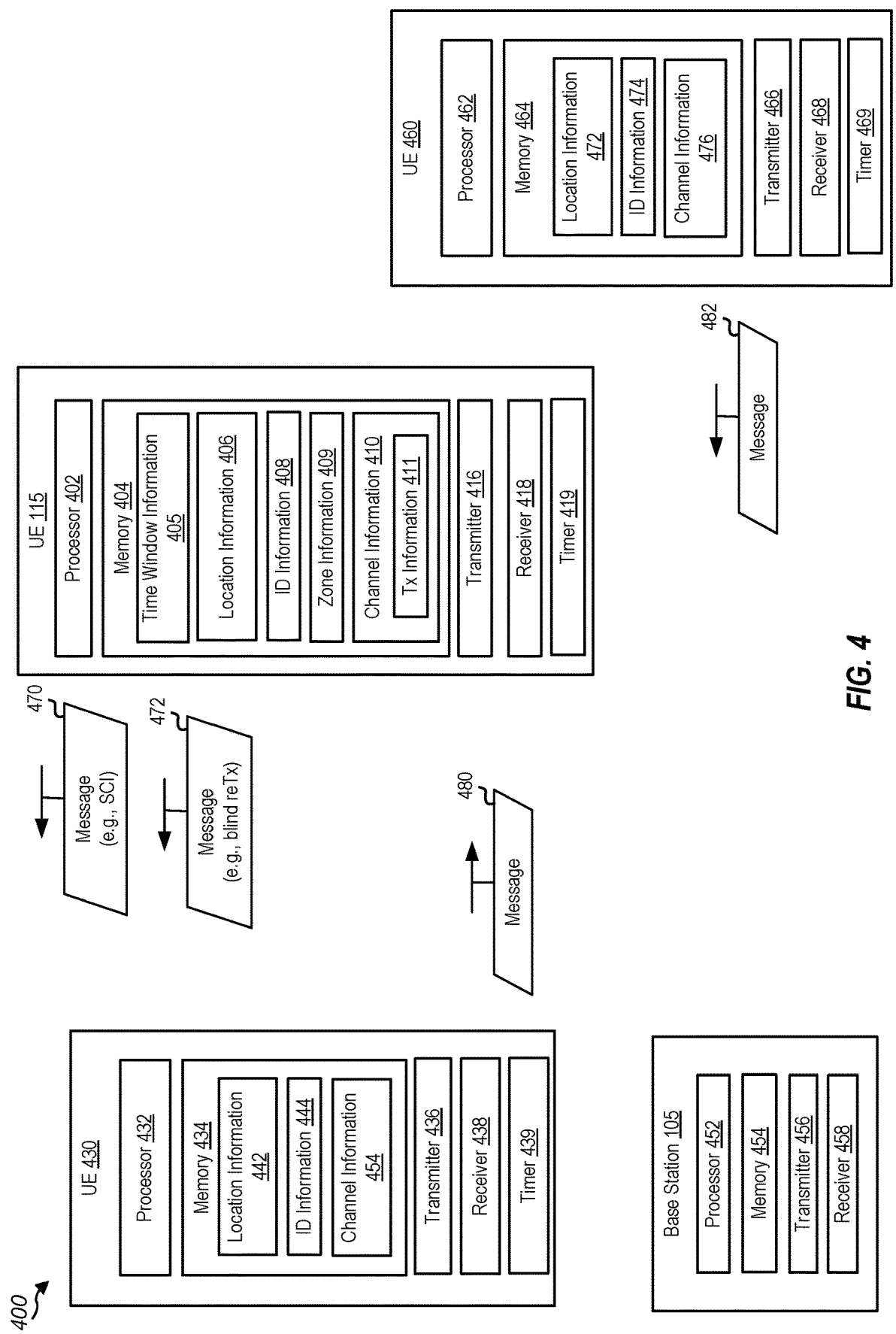
FIG. 4 is a block diagram illustrating an example wireless communication system that supports blind re-transmission (reTx) for sidelink communications according to one or more aspects.

FIG. 4 is a block diagram of an example wireless communications system 400 that supports blind reTx for sidelink communications according to one or more aspects. In some examples, wireless communications system 400 may implement aspects of wireless network 100. Wireless communications system 400 includes the UE 115, the base station 105, a UE 430, and a UE 460. UE 115, 430, or 460 may include or correspond to V2X entity, such as UEs 115i, 115j, or 115k to FIG. 1. Although three UEs and one base station are illustrated, in some other implementations, wireless communications system 400 may generally include fewer or more than three UEs and may include more than one base station or no base station.

In some implementations, wireless communication system 300 includes a V2X wireless communication system or an industrial Internet of things (IIoT) wireless communication system. V2X is a communication system in which information is passed between a vehicle and other entities within the wireless communication network that provides the V2X services. The V2X services may include services for Vehicle-to-Vehicle (V2V), Vehicle-to-Pedestrian (V2P), Vehicle-to-Infrastructure (V2I), and Vehicle-to-Network (V2N). One or more V2X standards aim to develop or support an Advanced Driver Assistance System (ADAS), which assist a driver with critical decisions, such as lane changes, speed changes, overtaking speeds, etc. Low latency communications may be used in V2X and, are therefore suitable for precise positioning. For example, positioning techniques, such as time of arrival (TOA), time difference of arrival (TDOA) or observed time difference of arrival (OT-DOA), or any other cellular positioning technique, may be enhanced using assistance from V2X. The V2X wireless communication system can utilize cellular based communication or wireless local area network communication. To illustrate, cellular V2X (C-V2X) is a 3rd Generation Partnership Project (3GPP) standard and uses 3GPP standardized 4G LTE or 5G mobile cellular connectivity to send and receive signals from a vehicle to other vehicles, pedestrians or to fixed objects such as traffic lights in its surroundings.

In general, there are two modes of operation for V2X services, as defined in Third Generation Partnership Project (3GPP) TS 23.285. One mode of operation uses direct wireless communications between V2X entities when the V2X entities are within range of each other. The other mode of operation uses network based wireless communication between entities. The two modes of operation may be combined or other modes of operation may be used if desired.

The wireless communication of a V2X wireless communication system may be over Proximity-based Services (ProSe) Direction Communication (PC5) reference point as defined in 3GPP TS 23.303, and may use wireless communications under Institute of Electrical and Electronics Engineers (IEEE) 1609, Wireless Access in Vehicular Environments (WAVE), Intelligent Transport Systems (ITS), and IEEE 802.11p, on the ITS band of 5.9 GHz, or other wireless connections directly between entities.

UE 115, such as a first UE, may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 416 (hereinafter referred to collectively as "transmitter 416"), and one or more receivers 418 (hereinafter referred to collectively as "receiver 418"), and a timer 419. Processor 402 may be configured to execute instructions stored in memory 404 to perform the operations described herein. In some implementations, processor 402 includes or corresponds to one or more of receive processor 258, transmit processor 264, and controller 280, and memory 404 includes or corresponds to memory 282.

Memory 404 includes or is configured to store time window information 405, location information 406, ID information 408, zone information 409, and channel information 410. Additionally, or alternatively, memory includes or is configured to store one or more thresholds.

Time window information 405 may define one or more time windows, such as a duration of a time window, a start time of the time window, an end time of the time window, or a combination thereof. In some implementations, a plurality of time windows may be arranged sequentially. In other implementations, two or more time windows may be at least partially overlapping in time. In other implementations, the time window may be a sliding window.

Location information 406 may indicate a location of UE 115, a location of another UE, or a combination thereof. The one or more locations included in location information 406 may be represented as a coordinates, a region or region ID, a zone or zone ID, or a combination thereof. For example, UE 115 may include a global positioning system (GPS) configured to determine a latitude, a longitude, elevation, or a combination thereof, of UE 115. To illustrate, the location may be a Global Navigation Satellite System (GNSS) location.

ID information 408 may include a source ID of the UE 115, a source ID of base station 105, a source ID for each of one or more other UEs, such as a source ID of UE 430, a source ID of UE 460, or a combination thereof.

Zone information 409 may include or indicate one or more zones, such as one or more geographic regions. Each zone may of the one or more zones may have a corresponding zone ID. In some implementations, at least one zone may have a zone state associated with a value that indicates a proximity to an intersection, such as an intersection of two roads, a higher probability of collisions between sidelink communications, or a combination thereof.

Channel information 410 may include information associated with a channel, such as link or sidelink, or other information associated with communication, such as V2X communication. For example, channel information 410 may include or correspond to a number of re-transmissions per packet in a time window, an average number of re-transmissions per packet in the time window, an RSRP threshold for resource selection/exclusion in the time window, an average RSRP threshold for resource selection/exclusion in the time window, a channel busy ratio (CBR), or a combination thereof. Additionally, or alternatively, channel information 410 may include a number of missing packets associated with a link, a packet error rate, or a combination thereof. Channel information 410 may also include Tx information 411, such as a number of blind transmissions (Tx), a number of real reTx (e.g., a reTx send based on feedback, such as a NACK), a number of blind reTx, a ratio based on a number of real reTx and a number of blind reTx, or a combination thereof.

Transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, base station 105. In some implementations, transmitter 416 and receiver 418 may be integrated in one or more transceivers. Additionally or alternatively, transmitter 416 or receiver 418 may include or correspond to one or more components of UE 115 described with reference to FIG. 2.

Timer 419 may be configured to determine or identify one or more time windows or one or more time periods. For example, timer 419 may be used to determine a duration of a time window based on time window information 405. As another example, timer may be used to determine a duration of a time period during which a number of missing packets is determined, a number of real reTx is determined, or a combination thereof. In some implementations, the time window and the time period have different durations. In other implementations, the time window and the time period have the same duration.

Base station 105 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). Processor 452 may be configured to execute instructions stored in memory 454 to perform the operations described herein. In some implementations, processor 352 includes or corresponds to one or more of receive processor 238, transmit processor 220, and controller 240, and memory 454 includes or corresponds to memory 242.

Transmitter 456 is configured to transmit reference signals, synchronization signals, control information and data to one or more other devices, and receiver 458 is configured to receive reference signals, control information and data from one or more other devices. For example, transmitter 456 may transmit signaling, control information and data to, and receiver 458 may receive signaling, control information and data from, UE 115. In some implementations, transmitter 456 and receiver 458 may be integrated in one or more transceivers. Additionally or alternatively, transmitter 456 or receiver 458 may include or correspond to one or more components of base station 105 described with reference to FIG. 2.

UE 430, such as a second UE, can include a variety of components (such as structural, hardware components) used for carrying out one or more functions described herein. For example, these components can include one or more processors 432 (hereinafter referred to collectively as "processor 432"), one or more memory devices 434 (hereinafter referred to collectively as "memory 434"), one or more transmitters 436 (hereinafter referred to collectively as "transmitter 436"), one or more receivers 438 (hereinafter referred to collectively as "receiver 438"), and a timer 439. Timer 439 may include or correspond to timer 419. In some implementations, UE 430 may include one or more additional components, such as a sensor (e.g., a temperature sensor) and a modem, as illustrative, non-limiting examples. Processor 432 may be configured to execute instructions stored in memory 434 to perform the operations described herein. In some implementations, processor 432 includes or corresponds to one or more of receive processor 258, transmit processor 264, and controller 280, and the memory 434 includes or corresponds to memory 282.

Memory 434 includes location information 442, ID information 444, and channel information 454. Location information 442 may include or correspond to location information 406. ID information 444 may include or correspond to ID information 408. Channel information 454 may include or correspond to channel information 410.

Transmitter 426 is configured to transmit data to one or more other devices, and receiver 428 is configured to receive data from one or more other devices. For example, transmitter 426 may transmit data to, and receiver 428 may receive data from, base station 105 or UEs 115 or 460. In some implementations, transmitter 426 and receiver 428 may be integrated in one or more transceivers. Additionally, or alternatively, transmitter 426, receiver 428, or both may include or correspond to one or more components of UE 115 described with reference to FIG. 2.

UE 460, such as a third UE, can include a variety of components (such as structural, hardware components) used for carrying out one or more functions described herein. For example, these components can include one or more processors 462 (hereinafter referred to collectively as "processor 462"), one or more memory devices 464 (hereinafter referred to collectively as "memory 464"), one or more transmitters 466 (hereinafter referred to collectively as "transmitter 466"), one or more receivers 468 (hereinafter referred to collectively as "receiver 468"), and a timer 469. Timer 469 may include or correspond to timer 419 or timer 439. In some implementations, UE 460 may include one or more additional components, such as a sensor (e.g., a temperature sensor) and a modem, as illustrative, non-limiting examples. Processor 462 may be configured to execute instructions stored in memory 464 to perform the operations described herein. In some implementations, processor 462 includes or corresponds to one or more of receive processor 258, transmit processor 264, and controller 280, and memory 464 includes or corresponds to memory 282.

Memory 464 includes location information 472, ID information 474, and channel information 476. Threshold 470 may include or correspond to threshold 440. Location information 472 may include or correspond to location information 406 or location information 442. ID information 474 may include or correspond to ID information 408 or ID information 444. Channel information 476 may include or correspond to channel information 410 or channel information 454.

Transmitter 466 is configured to transmit data to one or more other devices, and receiver 468 is configured to receive data from one or more other devices. For example, transmitter 466 may transmit data to, and receiver 468 may receive data from, base station 105 or UEs 115 or 430. In some implementations, transmitter 466 and receiver 468 may be integrated in one or more transceivers. Additionally, or alternatively, transmitter 466, receiver 468, or both may include or correspond to one or more components of UE 115 described with reference to FIG. 2.

In some implementations, a UE, such as UE 115, 430, or 460, may include or correspond to a road side unit (RSU). The RSU may include a stationary infrastructure entity supporting V2X applications that can exchange messages with other entities supporting V2X applications. An RSU may be a logical entity that may combine V2X application logic with the functionality of an eNB (referred to as eNB-type RSU) or UE (referred to as UE-type RSU).

In some implementations, wireless communications system 400 implements a 5G NR network. For example, wireless communications system 400 may include multiple 5G-capable UEs 115 and multiple 5G-capable base stations 105, such as UEs and base stations configured to operate in accordance with a 5G NR network protocol such as that defined by the 3GPP.

During operation of wireless communications system 400, UE 115 may transmit a message 470, such as SCI. After transmission of message 470, UE 115 may fail to receive a feedback message, such as a HARQ message, from one or more other devices. Based on failure to receive the feedback message, UE 115 may determine whether or not to initiate transmission of a message 472. Message 472 may include or correspond to a blind reTx, such as a reTx of the SCI. In some implementations, UE 115 may determine whether or not to transmit message 472 base a number of blind Txs. The number of blind Txs may be a preconfigured value or an adjusted value, such as an adjustment of the preconfigured value by UE 115.

In some implementations, UE 115 may use a physical (PHY) layer to determine whether or not to initiate blind Tx. To illustrate, UE 115 may track reservations, such as a log of reservations that are being reserved in the future. Additionally, the PHY layer be able to determine whether or not UE 115 is approaching a vehicular intersection. For example, the PHY layer of UE 115 also may detect that UE 115 is approaching the vehicular intersection based on one or more prior transmissions by UE 115. For example, over a time window $t_n$ having a width $T_{win}$, where n is an indexing value, UE 115 (e.g., the PHY layer) may determine a number of reTx per packet $N_{Tx}^n$, an RSRP threshold for resource selection/exclusion $\gamma_{Rsc-Ex}^n$, or both. The number of reTx window $N_{Tx}^n$ may include an average number of re-transmission per packet in the time window $t_n$. Additionally, or alternatively, the RSRP threshold for resource selection/exclusion $\gamma_{Rsc-Ex}^n$ may include a mean RSRP threshold in the time window $t_n$. The time window $t_n$ may include or correspond to time window information 405. The number of reTx window $N_{Tx}^n$ and the RSRP threshold for resource selection/exclusion $\gamma_{Rsc-Ex}^n$ may include or correspond to channel information 410.

UE 115 may compare measurements of a time window, such as a most recent time window, with one or more past measurements of one ow more time windows, such as time windows $t_{n-1}$, $t_{n-2}$, etc. For example, a first comparison may include determining whether $N_{Tx}^n \geq a + N_{Tx}^{n-1}$, where a is where a is greater than or equal to zero. As another example, a second comparison may include determining whether $\gamma_{Rsc-Ex}^n \leq \beta \times \gamma_{Rsc-Ex}^{n-1}$, where is greater than or equal to zero. In some implementations, a and may be set by a standard, a manufacturer, a system operator. Based on the comparison, UE 115 may determine whether or not UE 115 is approaching the vehicular intersection. For example, when $N_{Tx}^n \geq a + N_{Tx}^{n-1}$, $\gamma_{Rsc-Ex}^n \leq \beta \times \gamma_{Rsc-Ex}^{n-1}$, or a both, UE 115 may determine that a number of Re-Tx has increased without a substantial increase in a number of reservations. To illustrate, when $N_{Tx}^n \geq a + N_{Tx}^{n-1}$ and $\gamma_{Rsc-Ex}^n \leq \beta \times \gamma_{Rsc-Ex}^{n-1}$, this may imply that UE 115 is not receiving many of the SCI containing reservations, such as SCI of one or more hidden terminals. For example, UE 460 may be a hidden terminal that transmits a message 482, such as SCI, that is not received by UE 115 and that reserves a resource.

Based on $N_{Tx}^n \geq a + N_{Tx}^{n-1} \leq \beta \times \gamma_{Rsc-Ex}^{n-1}$, or a both, UE 115 may triggers blind reTx, such as transmission of message 472. In some implementations, UE 115 may perform the comparison for each time window of a plurality of time windows. Additionally, or alternatively, UE 115 may perform the comparison based on or during a zone change, such as a change in zone ID.

In some implementations, the number of reTx may be fixed, or may be determined by some algorithm based on zone ID, a CBR, another parameter, or a combination thereof. For example, the number of reTX may be a maximum number of reTx per packet, a maximum number or reTx per time window, or a maximum number of reTx per a time period. Additionally, or alternatively, the number of reTX may include or correspond to a blind reTx, a real reTx (e.g., a reTx based on a failure to receive a feedback message), or a combination thereof.

Figure 5:
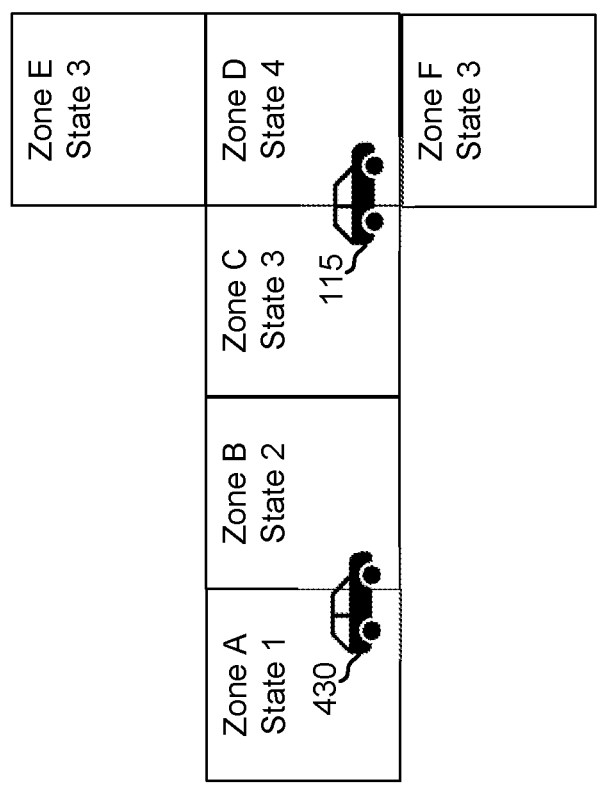
FIG. 5 is a diagram illustrating an example of zones associated with V2X communications according to one or more aspects.

Referring to FIG. 5, FIG. 5 is a is diagram illustrating an example of zones associated with V2X communications according to one or more aspects. The zones may include a first zone labeled Zone A, a second zone labeled Zone B, a third zone labeled zone C, a fourth zone labeled zone D, a fifth zone labeled zone E, and a sixth zone labeled zone F. The fourth zone may include or correspond to a vehicular intersection.

As shown, UE 115 and UE 430 are located (or traveling) in one or more zones. For example, UE 115 is in the first zone and traveling toward the second zone, and UE 115 is in the third zone and traveling toward the fourth zone.

Each UE may determine its number of reTxs, such as a number of blind reTxs. In some implementations a UE is configured (e.g., preconfigured) for the number of blind Tx it may perform near a cross-road. In other implementations, the UE may determine the number of blind Txs based on zone information. To illustrate, zone ID information may be provided by an application layer of the UE. The application may indicate both zone ID and a zone state (indicating possibility of hidden terminal). To illustrate, the first zone includes a zone state of state 1, the second zone includes a zone state of state 2, the third zone includes a zone state of state 3, the fourth zone includes a zone state of state 4, the fifth zone includes a zone state of state 3, and the sixth zone includes a zone state of state 3. Each increasing state indicates approaching an intersection having more chance of collisions of V2X communications. The zone ID, the zone state, or a combination thereof, may include or correspond to zone information 409.

The PHY layer of the UE may determine the number of Re-Tx based on the current zone ID and the zone state indicated by the application layer. The UE can determine the number of re-transmissions based on the state of its current zone. For example, state 1 may be associated with 1 blind reTx, state 2 may be associated with 3 blind reTx, state 3 may be associated with 2 blind reTX, and state 4 may be associated with 0 blind reTx.

Referring back to FIG. 4, in some implementations, UE 115 may use a CBR measurement to determine its number of reTxs. The CBR measurement may include or correspond to channel information 410. In some implementations, the UE 115 may use the CBR measurement in addition to one or more indications from the application layer, such as the zone ID or the zone state.

The CBR value may be used to increase or decrease the number of reTx. For example, UE 115 may determine to use fewer reTx than a pre-configured reTx when the CBR is high, such as greater than or equal to a threshold. Additionally, UE 115 may determine to use more reTx than a pre-configured when the CBR is low, such as less than or equal to the threshold. In some implementations, the UE 115 may adjust or modify the pre-configured reTX based on the CBR, such as solely based on its own CBR.

UE 115 may also determine to increase or decrease the number of reTx based on multiple CBR values, such as its own CBR and one or more CBRs of one or more other devices. For example, UE 115 may measures its own CBR and also receive one or more CBR values from its peers, such as peer CBR value from UE 430. To illustrate, UE 430 may transmit a message 480 to UE 115 that indicates the CBR value (e.g., a peer CBR value) of UE 430. UE 430 may send message 480 as part of sensor sharing, randomly, or periodically.

UE 115 may determine it is approaching an intersection or "hot spot" (e.g., an area with high V2X communication traffic) when $CBR_{meas}^{self} < \alpha(i) \times CBR_{meas}^{UE(i)}$, where factor α(i) may be fixed or may vary based on the peer UE's zone, RSRP, etc. Stated differently, UE 115 may determine it is approaching an intersection or "hot spot" when its CBR measured is less than the CBR reported by a neighbor UE by some factor. If UE 115 receives multiple peer CBR values, UE 115 may perform the above comparison for one or more of the multiple peer CBR values. UE 115 may determine that it is approaching an intersection or hot spot based on any one of the multiple peer CBR values. In some implementations, UE 115 may use its CBR value instead of a distance-based Re-Tx and RSRP based approach. In other implementations, UE 115 may use its CBR value in addition to an reTx and RSRP based approach.

In some implementations, the application layer of a UE may determine whether or not to, or when to, adjust a number of blind reTxs. In some implementations, each packet may have a unique app layer ID. For example, the each packet received via a link, such as a sidelink, may be numbered according to a known pattern, such as sequentially. The UE, such as UE 115 may determine how many packets are missing at a link based on the unique id.

In some implementations, the UE may estimate a packet error rate based on a number of missing packets. The UE may associated or store the packet error rate with a zone. The UE may communicate a number of blind Txs. For example, UE 115 may indicate the number of blind Txs in a medium access control-control element (MAC-CE). Additionally, or alternatively, the UE may communicate a ratio of real reTx and a number of blind Tx. For example, UE 115 may indicate the ratio in a MAC-CE. In some implementations, UE 115 may send a MAC-CE that indicates the number of blind Txs and the ratio.

In some implementations, the UE may increases the number of blind Tx when it enter a zone associated with a high packet error rate. For example, when UE 115 enters a zone the UE 115 has determined has a packet error rate greater than or equal to a first threshold, UE 115 may increase the number of blind Tx if the number of blind Tx is less than or equal to a second threshold, such as a configurable threshold. Additionally, or alternatively, when UE 115 enters a zone the UE 115 has determined has a packet error rate greater than or equal to a first threshold, UE 115 may increase the number of blind Tx if the ratio of the real reTx to the number of blind Tx is less than or equal to a third threshold, which may indicate feedback is not effective and more blind reTxs is appropriate. In some such implementations, the UE may transmit an indication of the number of blind Tx, the ratio of real reTx over number of blind Tx, or a combination thereof.

In some implementations, the UE may receive one or more message that indicate a packet error rate, such as a packet error rate associated with a zone. For example, UE 115 may receive message 480 from UE 430 or message 482 from UE 460 that indicates a packet error rate associated with a zone. To illustrate, message 480 or message 482 may include a MAC-Ce that indicates the packet error rate. Additionally, or alternatively, message 480 or message 482 may be transmitted periodically or included in another message. The UE may adjust (e.g., increase) the number of blind Tx when it enter a zone associated with a high packet error rate (received from another device). For example, when UE 115 enters a zone the UE 115 has determined has a packet error rate greater than or equal to a first threshold, UE 115 may increase the number of blind Tx if the number of blind Tx is less than or equal to a second threshold, such as a configurable threshold. Additionally, or alternatively, when UE 115 enters a zone the UE 115 has determined has a packet error rate greater than or equal to a first threshold, UE 115 may increase the number of blind Tx if the ratio of the real reTx to the number of blind Tx is less than or equal to a third threshold, which may indicate feedback is not effective and more blind reTxs is appropriate. In some such implementations, the UE may transmit an indication of the number of blind Tx, the ratio of real reTx over number of blind Tx, or a combination thereof.

As described with reference to FIG. 4, the present disclosure provides techniques for blind reTx for sidelink communication. For example, the techniques described with reference to FIG. 4 enable UE 115 to determine whether or not UE 115 is approaching a vehicular intersection. The techniques also enable UE 115 to determine or adjust a number of blind Txs, such as a number of blind reTxs. By determining or adjusting the number of blind Txs according to the techniques described with reference to at least FIG. 4, UE 115 may overcome challenges such as SCI decode failures, half-duplex issues, hidden node problems, and collisions, and ensure reliability for sidelink communication.

FIG. 6 is a flow diagram illustrating an example process 600 that supports blind re-transmission (reTx) for sidelink communications according to one or more aspects. Operations of process 600 may be performed by a UE, such UE 115 of FIG. 1, 2, 3A, 3B, or 4, UEs 430, 460 of FIG. 4, a UE described with reference to FIG. 5, or another device, such as an RSU, a PLC, or an S/A device. For example, example operations (also referred to as "blocks") of process 600 may enable UE 115 to support blind re-transmission (reTx) for sidelink communications. The UE may be configured for V2X communication. For example, the V2X communication may include C-V2X communication.

In block 602, the UE determines a first threshold based on a first number of re-transmissions per packet associated with a first time window, a second threshold based on a first RSRP threshold for resource selection/exclusion associated with the first time window, or a combination thereof. For example, UE 115 may determine the first time window based on time window information 405. Additionally, or alternatively, UE 115 determine the first number of re-transmissions per packet, the first RSRP threshold, or both, based on channel information 410.

In block 604, the UE initiates a blind Tx based on a determination that a second number of re-transmissions per packet associated with a second time window is greater than or equal to the first threshold, a determination that a second RSRP threshold associated with the second time window is less than or equal to the second threshold, or a combination thereof. For example, UE 115 may determine the second time window based on time window information 405. Additionally, or alternatively, UE 115 determine the second number of re-transmissions per packet, the second RSRP threshold, or both, based on channel information 410.

In some implementations, the first threshold may be further determined based on a first value added to the first number of re-transmissions per packet, the second threshold may be further determined based on a second value multiplied with the first RSRP threshold for resource selection/exclusion, or a combination thereof. Additionally or alternatively, the first number of re-transmissions per packet may include an average number of re-transmissions per packet associated with the first time window, the first RSRP threshold may include an average RSRP threshold associated with the first time window, or a combination thereof. Additionally or alternatively, an end of the first time window occurs prior to an end of the second time window.

In some implementations, process 600 may also include performing a first comparison based on the second number of re-transmissions per packet and the first threshold, performing a second comparison based on the second RSRP threshold and the second threshold, or a combination thereof. Additionally or alternatively, process 600 may include, for each time window of a plurality of time windows, performing a comparison of a number of re-transmissions per packet associated with a most recent time window and a threshold value determined based on a number of re-transmissions per packet associated with a previous time window prior to the most recent time window.

In some implementations, process 600 further includes, for each time window of a plurality of time windows, performing a comparison of an RSRP threshold for resource selection/exclusion associated with a most recent time window and a threshold value determined based on an RSRP threshold for resource selection/exclusion associated with a previous time window prior to the most recent time window. Additionally or alternatively, process 600 may also include identifying a transition from a first zone to a second zone, and, in response to identification of the transition, initiating the first comparison, the second comparison, or a combination thereof.

In some implementations, process 600 may include determining a maximum number of blind Txs available to be transmitted during a time period. In some such implementations, the time period may be the same size as each time window of a plurality of time windows. Additionally or alternatively, the maximum number of blind Txs may be determined based on a zone ID, a CBR, or a combination thereof.

In some implementations, process 600 may further include receiving, for each zone ID of a plurality of zone IDs, a zone state indicator. In some such implementations, each zone state indicator may be associated with a proximity to an intersection, a maximum number of blind Txs, or a combination thereof. Additionally or alternatively, process 600 may also include identifying a number of blind Txs, determining a CBR, adjusting the number of blind Txs based on the CBR, and performing a blind Tx based on the adjusted number of blind Txs.

FIG. 7 is a flow diagram illustrating an example process 700 that supports blind re-transmission (reTx) for sidelink communications according to one or more aspects. Operations of process 700 may be performed by a UE, such UE 115 of FIG. 1, 2, 3A, 3B, or 4, UEs 430, 460 of FIG. 4, a UE described with reference to FIG. 5, or another device, such as an RSU, a PLC, or an S/A device. For example, example operations (also referred to as "blocks") of process 700 may enable UE 115 to support blind re-transmission (reTx) for sidelink communications. The UE may be configured for V2X communication. For example, the V2X communication may include C-V2X communication.

In block 702, the UE identifies a number of blind Txs. For example, UE 115 may determine the number of blind Txs based on Tx information 411. In block 704, the UE determines a CBR. For example, the CBR may be indicated by channel information 410 of FIG. 4.

In block 706, the UE adjusts the number of blind Txs based on the CBR. For example, UE 115 may adjust the number of blind Txs included in Tx information 4100. In block 708, the UE performs a blind TX based on the adjusted number of blind Txs. For example, UE 115 may transmit message 472.

In some implementations, the number of blind Txs may correspond to a number of maximum blind Txs available to be transmitted during a time period. Additionally or alternatively, the CBR may indicate a proportion of channel time where an energy measured on a channel is greater than or equal to a CCA threshold. Additionally or alternatively, process 700 may further include determining whether the number of blind Txs is less than or equal to a first threshold. Adjusting the number of blind Txs may include increasing the number of blind Txs based on a determination that the number of blind Txs is less than the first threshold.

In some implementations, process 700 may include performing a comparison based on the CBR and a second threshold and adjusting the number of blind Txs based on a result of the comparison. In some such implementations, if the CBR is greater than the second threshold, adjusting the number of blind Txs may include decreasing the number of blind Txs. Alternatively, if the CBR is less than the second threshold, adjusting the number of blind Txs may include increasing the number of blind Txs.

In some implementations, process 700 may also include receiving a message that indicates a peer CBR of a device. In some such implementations, process 700 may also include determining a comparison CBR value based on the peer CBR and performing a comparison based on the CBR and the comparison CBR value. In some such implementations, the comparison CBR value may be further determined based on a multiplier. In some such implementations, process 700 may further include determining the multiplier based on a zone of the device, a RSRP, or a combination thereof. Additionally or alternatively, process 700 may also include determining whether or not the UE is approaching an intersection or a congested area based on the comparison. In some such implementations, process 700 may further include determining that the UE is approaching the intersection or the congested area based on a determination that the CBR is less than or equal to the comparison CBR value.

Figure 8:
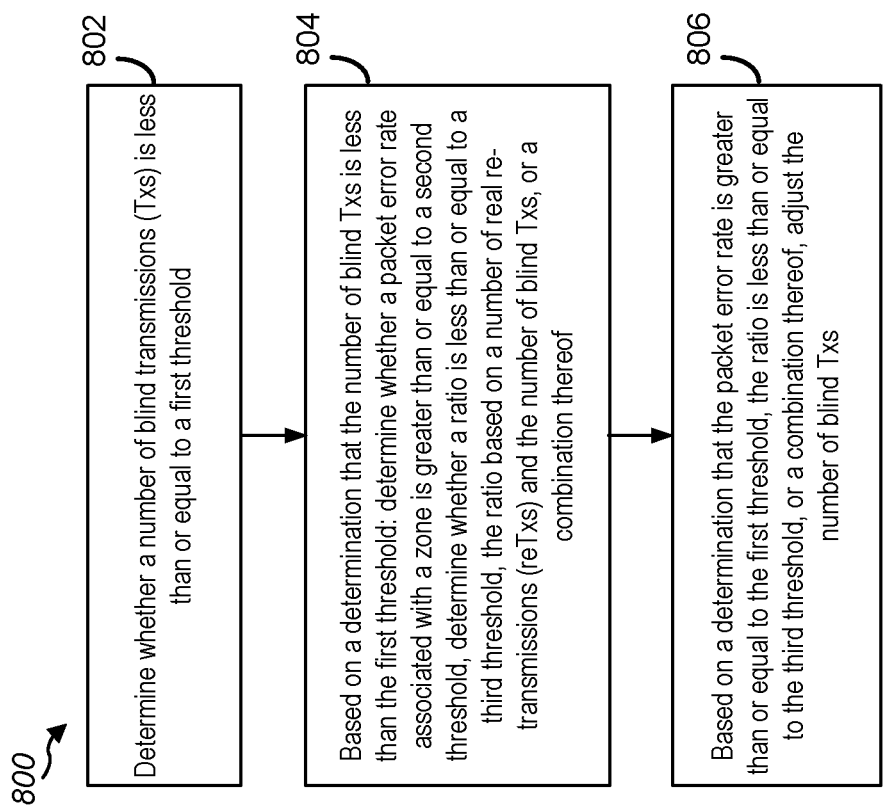
FIG. 8 is a flow diagram illustrating an example process that supports blind reTx for sidelink communication according to one or more aspects.

FIG. 8 is a flow diagram illustrating an example process 800 that supports blind re-transmission (reTx) for sidelink communications according to one or more aspects. Operations of process 800 may be performed by a UE, such UE 115 of FIG. 1, 2, 3A, 3B, or 4, UEs 430, 460 of FIG. 4, a UE described with reference to FIG. 5, or another device, such as an RSU, a PLC, or an S/A device. For example, example operations (also referred to as "blocks") of process 800 may enable UE 115 to support blind re-transmission (reTx) for sidelink communications. The UE may be configured for V2X communication. For example, the V2X communication may include C-V2X communication.

In block 802, the UE determines whether a number of blind Txs is less than or equal to a first threshold. For example, the number of blind Txs may include or correspond to Tx information 411.

In block 804, the UE, based on a determination that the number of blind Txs is less than the first threshold, determines whether a packet error rate associated with a zone is greater than or equal to a second threshold, determines whether a ratio is less than or equal to a third threshold, the ratio based on a number of real reTxs and the number of blind Txs, or a combination thereof. For example, the packet error rate, the ratio, or both, may include or correspond to channel information 410.

In block 806, the UE, based on a determination that the packet error rate is greater than or equal to the first threshold, the ratio is less than or equal to the third threshold, or a combination thereof, adjusts the number of blind Txs. For example, UE 115 may adjust the number of blind Txs and store corresponding information as part of Tx information 411.

In some implementations, the number of blind Txs may correspond to a maximum number of blind Txs available to be transmitted during a time period. Additionally or alternatively, process 800 may also include performing a blind Tx based on the adjusted number of blind Txs. Additionally or alternatively, process 800 may further include determining the packet error rate associated with the zone.

In some implementations, process 800 may include determining a number of missing packets associated with a sidelink and estimating the packet error rate associated with the zone based on the number of missing packets. In some such implementations, the number of missing packets may be based on a unique application layer ID for a packet associated with the sidelink. Additionally or alternatively, process 800 may also include determining the number of blind Txs and transmitting a message that indicates the number of blind Txs. In some such implementations, the message may include a MAC-CE.

In some implementations, process 800 may further include determining the ratio based on the number of real reTxs and the number of blind Txs and transmitting a message that indicates the ratio. In some such implementations, the message may include a MAC-CE. Additionally or alternatively, the ratio may be the number of real reTxs to the number of blind Txs, and the number of real reTxs includes a number of reTxs transmitted responsive to a feedback message.

In some implementations, process 800 may also include receiving a message that indicates the packet error rate. In some such implementations, the message may include a MAC-CE. Additionally or alternatively, process 800 may further include identifying the number of blind Txs, determining a CBR, adjusting the maximum number of blind Txs based on the CBR, and performing a blind Tx based on the adjusted maximum number of blind Txs.

Figure 9:
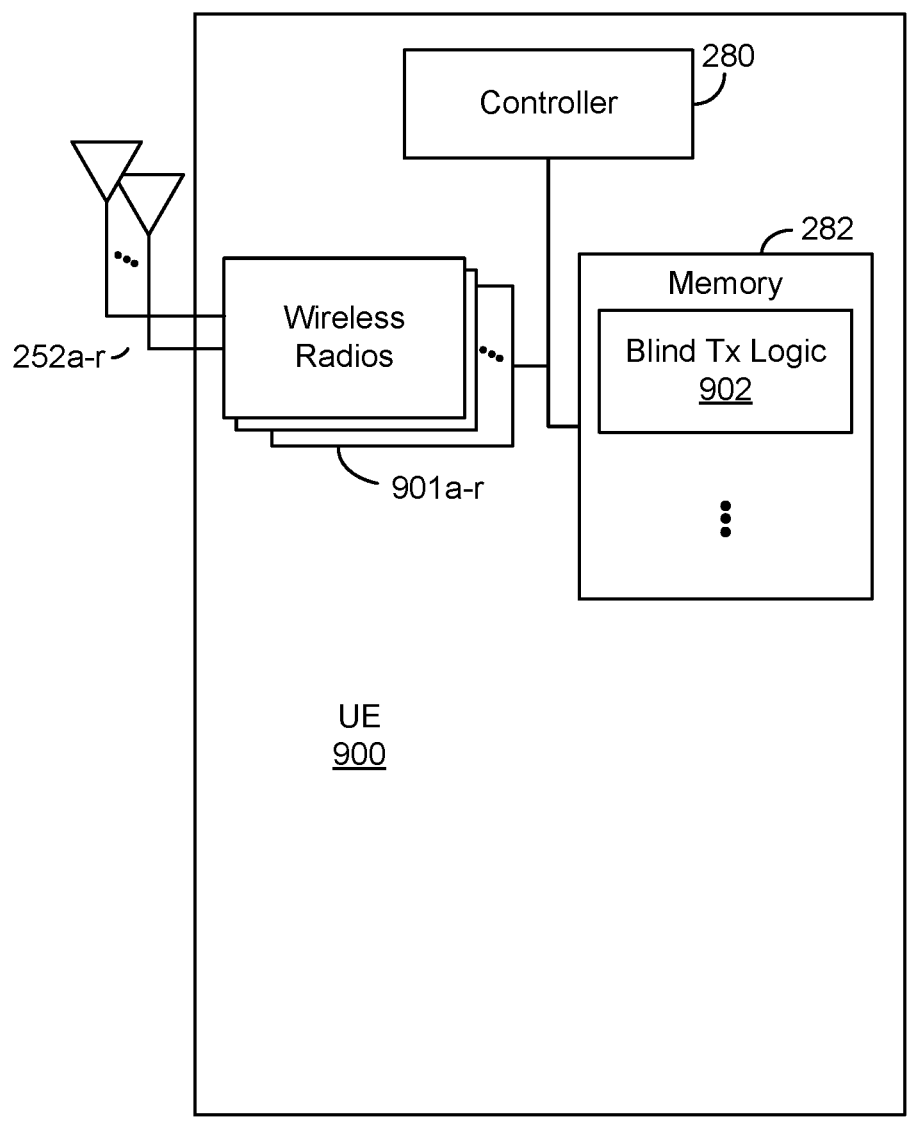
FIG. 9 is a block diagram of an example UE that supports blind reTx for sidelink communication according to one or more aspects.

FIG. 9 is a block diagram of an example UE 900 that supports blind re-transmission (reTx) for sidelink communications to one or more aspects. UE 900 may be configured to perform operations, including the blocks of a process described with reference to FIGS. 6-8. In some implementations, UE 900 includes the structure, hardware, and components shown and described with reference to UE 115 of FIGS. 1, 2, 3A, 3B, 4. For example, UE 900 includes controller 280, which operates to execute logic or computer instructions stored in memory 282, as well as controlling the components of UE 900 that provide the features and functionality of UE 900. UE 900, under control of controller 280, transmits and receives signals via wireless radios 901*a-r* and antennas 252*a-r*. Wireless radios 901*a-r* include various components and hardware, as illustrated in FIG. 2 for UE 115, including modulator and demodulators 254*a-r*, MIMO detector 256, receive processor 258, transmit processor 264, and TX MIMO processor 266.

As shown, memory 282 may include blind Tx logic 902. blind Tx logic 902 may be configured to determine a number of blind Txs, initiate a blind Tx, adjust the number of blind Txs, or a combination thereof. UE 800 may receive signals from or transmit signals to one or more network entities, such as base station 105 of FIG. 1, 2, 3A, or 4, another UE, an RSU, another device, or a combination thereof.

Although the processes 600, 700, and 800 are described as being performed by a UE, in some other implementations, the process of FIGS. 6-8 may be performed by an apparatus configured for wireless communication. For example, the apparatus may include at least one processor, and a memory coupled to the processor. The processor may be configured to perform operations of one or more of the processes of FIGS. 6-8. In some other implementations, the processes of FIGS. 6-7 may be performed or executed using a non-transitory computer-readable medium having program code recorded thereon. The program code may be program code executable by a computer for causing the computer to perform operations of one or more of the processes of FIGS. 6-7.

It is noted that one or more blocks (or operations) described with reference to FIGS. 6-8 may be combined with one or more blocks (or operations) described with reference to another of the figures. For example, one or more blocks (or operations) of FIG. 6 may be combined with one or more blocks (or operations) of FIG. 7. As another example, one or more blocks associated with FIG. 6 may be combined with one or more blocks associated with FIG. 8. As another example, one or more blocks associated with FIG. 7 may be combined with one or more blocks associated with FIG. 8. As another example, one or more blocks associated with FIGS. 6-8 may be combined with one or more blocks (or operations) associated with FIG. 1, 2, 3A, 3B, 4, or 5. Additionally, or alternatively, one or more operations described above with reference to FIG. 1, 2, 3A, 3B, 4, or 5 may be combined with one or more operations described with reference to FIG. 9.

In one or more aspects, techniques for supporting reTx for sidelink communication may include additional aspects, such as any single aspect or any combination of aspects described below or in connection with one or more other processes or devices described elsewhere herein. In a first aspect, techniques for supporting reTx for sidelink communication may include determining a first threshold based on a first number of re-transmissions per packet associated with a first time window, a second threshold based on a first RSRP threshold for resource selection/exclusion associated with the first time window, or a combination thereof. The techniques further include initiating a blind Tx based on a determination that a second number of re-transmissions per packet associated with a second time window is greater than or equal to the first threshold, a determination that a second RSRP threshold associated with the second time window is less than or equal to the second threshold, or a combination thereof. In some examples, the techniques in the first aspect may be implemented in a method or process. In some other examples, the techniques of the first aspect may be implemented in a wireless communication device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a second aspect, in combination with the first aspect, the first threshold is further determined based on a first value added to the first number of re-transmissions per packet, the second threshold is further determined based on a second value multiplied with the first RSRP threshold for resource selection/exclusion, or a combination thereof.

In a third aspect, in combination with the first aspect or the second aspect, the first number of re-transmissions per packet includes an average number of re-transmissions per packet associated with the first time window, the first RSRP threshold includes an average RSRP threshold associated with the first time window, or a combination thereof.

In a fourth aspect, in combination with one or more of the first aspect through the third aspect, an end of the first time window occurs prior to an end of the second time window.

In a fifth aspect, in combination with one or more of the first aspect through the fourth aspect, the techniques further include performing a first comparison based on the second number of re-transmissions per packet and the first threshold, perform a second comparison based on the second RSRP threshold and the second threshold, or a combination thereof.

In a sixth aspect, in combination with one or more of the first aspect through the fifth aspect, the techniques further include, for each time window of a plurality of time windows, performing a comparison of a number of re-transmissions per packet associated with a most recent time window and a threshold value determined based on a number of re-transmissions per packet associated with a previous time window prior to the most recent time window.

In a seventh aspect, in combination with one or more of the first aspect through the fifth aspect, the techniques further include identifying a transition from a first zone to a second zone.

In an eighth aspect, in combination with the seventh aspect, the techniques further include, in response to identification of the transition, initiating the first comparison, the second comparison, or a combination thereof.

In a ninth aspect, in combination with one or more of the first aspect through the eighth aspect, the techniques further include determining a maximum number of blind Txs available to be transmitted during a time period.

In a tenth aspect, in combination with the ninth aspect, the time period is the same size as each time window of a plurality of time windows.

In an eleventh aspect, in combination with the ninth aspect or the tenth aspect, the maximum number of blind Txs is determined based on a zone ID, a CBR, or a combination thereof.

In a twelfth aspect, in combination with one or more of the first aspect through the eleventh aspect, the techniques further include receiving, for each zone ID of a plurality of zone IDs, a zone state indicator.

In a thirteenth aspect, in combination with the twelfth aspect, each zone state indicator is associated with a proximity to an intersection or a collision hotspot, a maximum number of blind Txs, or a combination thereof. For example the intersection may include or correspond to a vehicular intersection, such as a location where two or more or roads meet or where cross-traffic meets. Additionally, or alternatively, the collision hotspot may include or correspond to a location or zone in which there is an increased chance or high potential for collisions of V2X communications, such as SCIs, as an illustrative, non-limiting example.

In a fourteenth aspect, in combination with one or more of the first aspect through the thirteenth aspect, the techniques further include identifying a number of blind Txs.

In a fifteenth aspect, in combination with the fourteenth aspect, the techniques further include determining a CBR.

In a sixteenth aspect, in combination with the fifteenth aspect, the techniques further include adjusting the number of blind Txs based on the CBR.

In a seventeenth aspect, in combination with the sixteenth aspect, the techniques further include performing a blind Tx based on the adjusted number of blind Txs.

In one or more aspects, techniques for supporting reTx for sidelink communication may include additional aspects, such as any single aspect or any combination of aspects described below or in connection with one or more other processes or devices described elsewhere herein. In an eighteenth aspect, techniques for supporting reTx for sidelink communication include identifying a number of blind Txs. The techniques may further include determining a CBR. The techniques further include adjusting the number of blind Txs based on the CBR, and performing a blind Tx based on the adjusted number of blind Txs. In some examples, the techniques in the eighteenth aspect may be implemented in a method or process. In some other examples, the techniques of the eighteenth aspect may be implemented in a wireless communication device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a nineteenth aspect, in combination with the eighteenth aspect, the number of blind Txs corresponds to a number of maximum blind Txs available to be transmitted during a time period.

In a twentieth aspect, in combination with the eighteenth aspect or the nineteenth aspect, the CBR indicates a proportion of channel time where an energy measured on a channel is greater than or equal to a CCA threshold.

In a twenty-first aspect, in combination with one or more of the eighteenth aspect through the twentieth aspect, the techniques further include determining whether the number of blind Txs is less than or equal to a first threshold.

In a twenty-second aspect, in combination with the twenty-first aspect, adjusting the number of blind Txs includes increasing the number of blind Txs based on a determination that the number of blind Txs is less than the first threshold.

In a twenty-third aspect, in combination with one or more of the eighteenth aspect through the twenty-first aspect, the techniques further include performing a comparison based on the CBR and a second threshold.

In a twenty-fourth aspect, in combination with the twenty-third aspect, the number of blind Txs is adjusted based on a result of the comparison.

In a twenty-fifth aspect, in combination with the twenty-fourth aspect, if the CBR is greater than the second threshold, adjusting the number of blind Txs includes decreasing the number of blind Txs.

In a twenty-sixth aspect, in combination with the twenty-fourth aspect, if the CBR is less than the second threshold, adjusting the number of blind Txs includes increasing the number of blind Txs.

In a twenty-seventh aspect, in combination with one or more of the eighteenth aspect through the twenty-sixth aspect, the techniques further include receiving a message that indicates a peer CBR of a device.

In a twenty-eighth aspect, in combination with the twenty-seventh aspect, the techniques further include determining a comparison CBR value based on the peer CBR.

In a twenty-ninth aspect, in combination with the twenty-eighth aspect, the techniques further include performing a comparison based on the CBR and the comparison CBR value.

In a thirtieth aspect, in combination with the twenty-ninth aspect, the comparison CBR value is further determined based on a multiplier.

In a thirty-first aspect, in combination with the thirtieth aspect, the techniques further include determining the multiplier based on a zone of the device, a RSRP, or a combination thereof.

In a thirty-second aspect, in combination with the thirtieth aspect or the thirty-first aspect, the techniques further include determining whether or not an intersection or a congested area is becoming closer based on the comparison.

In a thirty-third aspect, in combination with the thirty-second aspect, the techniques further include determining the intersection or the congested area is becoming closer based on a determination that the CBR is less than or equal to the comparison CBR value.

In one or more aspects, techniques for supporting blind reTx for sidelink communication may include additional aspects, such as any single aspect or any combination of aspects described below or in connection with one or more other processes or devices described elsewhere herein. In a thirty-fourth aspect, techniques for supporting reTx for sidelink communication include determining whether a number of blind Txs is less than or equal to a first threshold. The techniques further include, based on a determination that the number of blind Txs is less than the first threshold, determining whether a packet error rate associated with a zone is greater than or equal to a second threshold, determine whether a ratio is less than or equal to a third threshold, the ratio based on a number of real reTxs and the number of blind Txs, or a combination thereof. The techniques further include, based on a determination that the packet error rate is greater than or equal to the first threshold, the ratio is less than or equal to the third threshold, or a combination thereof, adjusting the number of blind Txs. In some examples, the techniques in the thirty-fourth aspect may be implemented in a method or process. In some other examples, the techniques of the thirty-fourth aspect may be implemented in a wireless communication device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a thirty-fifth aspect, in combination with the thirty-fourth aspect, the number of blind Txs corresponds to a maximum number of blind Txs available to be transmitted during a time period.

In a thirty-sixth aspect, in combination with the thirty-fourth aspect or the third-fifth aspect, the techniques further include performing a blind Tx based on the adjusted number of blind Txs.

In a thirty-seventh aspect, in combination with one or more of the thirty-fourth aspect through the thirty-sixth aspect, the techniques further include determining the packet error rate associated with the zone.

In a thirty-eighth aspect, in combination with one or more of the thirty-fourth aspect through the thirty-seventh aspect, the techniques further include determining a number of missing packets associated with a sidelink.

In a thirty-ninth aspect, in combination with the thirty-eighth aspect, the techniques further include estimating the packet error rate associated with the zone based on the number of missing packets.

In a fortieth aspect, in combination with the thirty-ninth aspect, the number of missing packets is based on a unique application layer ID for a packet associated with the sidelink.

In a forty-first aspect, in combination with one or more of the thirty-fourth aspect through the fortieth aspect, the techniques further include determining the number of blind Txs.

In a forty-second aspect, in combination with the forty-first aspect, the techniques further include initiating transmission of or transmitting a message that indicates the number of blind Txs.

In a forty-third aspect, in combination with the forty-second aspect, the message includes a MAC-CE.

In a forty-fourth aspect, in combination with one or more of the thirty-fourth aspect through the forty-third aspect, the techniques further include determining the ratio based on the number of real reTxs and the number of blind Txs.

In a forty-fifth aspect, in combination with the forty-fourth aspect, the techniques further include initiating transmission of or transmitting a message that indicates the ratio.

In a forty-sixth aspect, in combination with the forty-fifth aspect, the message includes a MAC-CE.

In a forty-seventh aspect, in combination with the forty-fifth aspect or the forty-sixth aspect, the ratio is the number of real reTxs to the number of blind Txs, and the number of real reTxs includes a number of reTxs transmitted responsive to a feedback message.

In a forty-eighth aspect, in combination with one or more of the thirty-fourth aspect through the forty-seventh aspect, the techniques further include receiving a message that indicates the packet error rate.

In a forty-ninth aspect, in combination with the forty-eighth aspect, the message includes a MAC-CE.

In a fiftieth aspect, in combination with one or more of the thirty-fourth aspect through the forty-ninth aspect, the techniques further include identifying the number of blind Txs.

In a fifty-first aspect, in combination with the fiftieth aspect, the techniques also include determining a CBR.

In a fifty-second aspect, in combination with the fifty-first aspect, the techniques also include adjusting the maximum number of blind Txs based on the CBR.

In a fifty-third aspect, in combination with the fifty-second aspect, the techniques also include performing a blind Tx based on the adjusted maximum number of blind Txs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
    determining a first threshold based on a first number of re-transmissions per packet associated with a first time window, a second threshold based on a first reference signal receive power (RSRP) threshold for resource selection/exclusion associated with the first time window, or a combination thereof; and
    initiating a blind transmission (Tx) based on a determination that a second number of re-transmissions per packet associated with a second time window is greater than or equal to the first threshold, a determination that a second RSRP threshold for resource selection/exclusion associated with the second time window is less than or equal to the second threshold, or a combination thereof.

2. The method of claim 1, wherein:
    an end of the first time window occurs prior to an end of the second time window; or
    the first threshold is further determined based on a first value added to the first number of re-transmissions per packet, the second threshold is further determined based on a second value multiplied with the first RSRP threshold for resource selection/exclusion, or a combination thereof.

3. The method of claim 1, wherein:
    an end of the first time window occurs prior to an end of the second time window; or
    the first number of re-transmissions per packet includes an average number of re-transmissions per packet associated with the first time window, the first RSRP threshold includes an average RSRP threshold associated with the first time window, or a combination thereof.

4. The method of claim 1, further comprising:
    identifying a transition from a first zone to a second zone; and
    performing a first comparison based on the second number of re-transmissions per packet and the first threshold;
    performing a second comparison based on the second RSRP threshold and the second threshold; or
    a combination thereof; and
    wherein the first comparison, the second comparison, or a combination thereof is initiated in response to identification of the transition.

5. The method of claim 1, further comprising:
    for each time window of a plurality of time windows, performing a comparison of a number of re-transmissions per packet associated with a most recent time window and a threshold value determined based on a number of re-transmissions per packet associated with a previous time window prior to the most recent time window; or
    for each time window of a plurality of time windows, performing a comparison of an RSRP threshold for resource selection/exclusion associated with a most recent time window and a threshold value determined based on an RSRP threshold for resource selection/exclusion associated with a previous time window prior to the most recent time window.

6. The method of claim 1, further comprising:
    determining a maximum number of blind transmissions (Txs) available to be transmitted during a time period; and
    wherein the time period is the same size as each time window of a plurality of time windows, or
    wherein the maximum number of blind Txs is determined based on a zone identity (ID), a channel busy ratio (CBR), or a combination thereof.

7. The method of claim 1, further comprising:
    receiving, for each zone identify (ID) of a plurality of zone IDs, a zone state indicator; and
    wherein each zone state indicator is associated with a proximity to an intersection, a maximum number of blind Txs, or a combination thereof.

8. The method of claim 1, further comprising:
    identifying a number of blind transmissions (Txs);
    determining a channel busy ratio (CBR);
    adjusting the number of blind Txs based on the CBR; and performing a blind Tx based on the adjusted number of blind Txs; and wherein the number of blind Txs corresponds to a number of maximum blind Txs available to be transmitted during a time period; or wherein the CBR indicates a proportion of channel time where an energy measured on a channel is greater than or equal to a clear channel assessment (CCA) threshold.

9. The method of claim 8, further comprising:
determining whether the number of blind Txs is less than or equal to a first threshold; and
wherein adjusting the number of blind Txs includes increasing the number of blind Txs based on a determination that the number of blind Txs is less than the first threshold.

10. The method of claim 8, further comprising:
performing a comparison based on the CBR and a second threshold; and
wherein the number of blind Txs is adjusted based on a result of the comparison; and
if the CBR is greater than the second threshold, adjusting the number of blind Txs includes decreasing the number of blind Txs; or
if the CBR is less than the second threshold, adjusting the number of blind Txs includes increasing the number of blind Txs.

11. The method of claim 8, further comprising:
receiving a message that indicates a peer CBR of a device;
determining a comparison CBR value based on the peer CBR;
performing a comparison based on the CBR, the comparison CBR value, a multiplier, or a combination thereof; and
determining the multiplier based on a zone of the device, a reference signal receive power (RSRP), or a combination thereof; or
determining, based on a determination that the CBR is less than or equal to the comparison CBR value, whether or not the UE is approaching an intersection or a congested area based on the comparison.

12. A user equipment (UE) comprising:
a memory storing processor-readable code; and
at least one processor coupled to the memory, the at least one processor configured to execute the processor-readable code to cause the at least one processor to:
determine a first threshold based on a first number of re-transmissions per packet associated with a first time window, a second threshold based on a first reference signal receive power (RSRP) threshold for resource selection/exclusion associated with the first time window, or a combination thereof; and
initiate a blind transmission (Tx) based on a determination that a second number of re-transmissions per packet associated with a second time window is greater than or equal to the first threshold, a determination that a second RSRP threshold for resource selection/exclusion associated with the second time window is less than or equal to the second threshold, or a combination thereof.

13. The UE of claim 12, wherein:
an end of the first time window occurs prior to an end of the second time window; or
the first threshold is further determined based on a first value added to the first number of re-transmissions per packet, the second threshold is further determined based on a second value multiplied with the first RSRP threshold for resource selection/exclusion, or a combination thereof.

14. The UE of claim 12, wherein:
an end of the first time window occurs prior to an end of the second time window; or
the first number of re-transmissions per packet includes an average number of re-transmissions per packet associated with the first time window, the first RSRP threshold includes an average RSRP threshold associated with the first time window, or a combination thereof.

15. The UE of claim 12, wherein the at least one processor is further configured to execute the processor-readable code to cause the at least one processor to:
identify a transition from a first zone to a second zone; and
perform a first comparison based on the second number of re-transmissions per packet and the first threshold, perform a second comparison based on the second RSRP threshold and the second threshold, or a combination thereof; and
wherein the first comparison, the second comparison, or a combination thereof is initiated in response to identification of the transition.

16. The UE of claim 12, wherein the at least one processor is further configured to execute the processor-readable code to cause the at least one processor to:
for each time window of a plurality of time windows, perform a comparison of a number of re-transmissions per packet associated with a most recent time window and a threshold value determined based on a number of re-transmissions per packet associated with a previous time window prior to the most recent time window; or
for each time window of a plurality of time windows, perform a comparison of an RSRP threshold for resource selection/exclusion associated with a most recent time window and a threshold value determined based on an RSRP threshold for resource selection/exclusion associated with a previous time window prior to the most recent time window.

17. The UE of claim 12, wherein the at least one processor is further configured to execute the processor-readable code to cause the at least one processor to:
determine a maximum number of blind transmissions (Txs) available to be transmitted during a time period; and
wherein the time period is the same size as each time window of a plurality of time windows, or
wherein the maximum number of blind Txs is determined based on a zone identity (ID), a channel busy ratio (CBR), or a combination thereof.

18. The UE of claim 12, wherein the at least one processor is further configured to execute the processor-readable code to cause the at least one processor to:
receive, for each zone identify (ID) of a plurality of zone IDs, a zone state indicator; and
wherein each zone state indicator is associated with a proximity to an intersection, a maximum number of blind Txs, or a combination thereof.

19. The UE of claim 12, wherein the at least one processor is further configured to execute the processor-readable code to cause the at least one processor to:
identify a number of blind transmissions (Txs);
determine a channel busy ratio (CBR);
adjust the number of blind Txs based on the CBR; and
perform a blind Tx based on the adjusted number of blind Txs; and wherein the number of blind Txs corresponds to a number of maximum blind Txs available to be transmitted during a time period; or wherein the CBR indicates a proportion of channel time where an energy measured on a channel is greater than or equal to a clear channel assessment (CCA) threshold.

20. The UE of claim 19, wherein the at least one processor is further configured to execute the processor-readable code to cause the at least one processor to:

determine whether the number of blind Txs is less than or equal to a first threshold; and to adjust the number of blind Txs, increase the number of blind Txs based on a determination that the number of blind Txs is less than the first threshold.

21. The UE of claim 19, wherein the at least one processor is further configured to execute the processor-readable code to cause the at least one processor to:

perform a comparison based on the CBR and a second threshold, the number of blind Txs is adjusted based on a result of the comparison; and if the CBR is greater than the second threshold, adjust the number of blind Txs includes decreasing the number of blind Txs; or if the CBR is less than the second threshold, adjust the number of blind Txs includes increasing the number of blind Txs.

22. The UE of claim 19, wherein the at least one processor is further configured to execute the processor-readable code to cause the at least one processor to:

receive a message that indicates a peer CBR of a device, determine a comparison CBR value based on the peer CBR;

perform a comparison based on the CBR, the comparison CBR value, a multiplier, or a combination thereof; and determine the multiplier based on a zone of the device, a reference signal receive power (RSRP), or a combination thereof; or determine, based on a determination that the CBR is less than or equal to the comparison CBR value, whether or not the UE is approaching an intersection or a congested area based on the comparison.

* * * * *